(12) United States Patent
Jamali et al.

(10) Patent No.: US 12,456,045 B2
(45) Date of Patent: Oct. 28, 2025

(54) EMBEDDED LEARNING FOR RESPONSE PREDICTION IN CONTENT ITEM RELEVANCE

(71) Applicant: Microsoft Technology Licensing, LLC, Redmond, WA (US)

(72) Inventors: Seyedmohsen Jamali, Sunnyvale, CA (US); Samaneh Abbasi Moghaddam, Sunnyvale, CA (US); Revant Kumar, Sunnyvale, CA (US); Vinay Praneeth Boda, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1946 days.

(21) Appl. No.: 16/370,886

(22) Filed: Mar. 30, 2019

(65) Prior Publication Data

US 2020/0311543 A1 Oct. 1, 2020

(51) Int. Cl.
*G06N 3/08* (2023.01)
*G06N 3/045* (2023.01)
*G06Q 10/0631* (2023.01)

(52) U.S. Cl.
CPC ............... *G06N 3/08* (2013.01); *G06N 3/045* (2023.01); *G06Q 10/063112* (2013.01)

(58) Field of Classification Search
CPC ... G06N 3/08; G06N 3/045; G06Q 10/063112
USPC .......................................................... 706/12
See application file for complete search history.

(56) References Cited

U.S. PATENT DOCUMENTS

| 8,676,736 | B2* | 3/2014 | Pilaszy | G06Q 30/00 |
| | | | | 707/758 |
| 9,721,203 | B1* | 8/2017 | Young | G06N 3/08 |
| 2017/0098140 | A1* | 4/2017 | Wang | G06V 30/245 |
| 2018/0204113 | A1* | 7/2018 | Galron | G06Q 30/0631 |
| 2019/0132359 | A1* | 5/2019 | Kraenzel | H04L 63/1491 |
| 2019/0188561 | A1* | 6/2019 | Tang | H04L 67/306 |
| 2019/0312897 | A1* | 10/2019 | Wang | H04L 63/1433 |

OTHER PUBLICATIONS

Nanni & Lumini, 2012, "A classifier ensemble approach for the missing feature problem" (Year: 2012).*
Han et al, 2017, "Learning Fashion Compatibility with Bidirectional LSTMs" (Year: 2017).*

* cited by examiner

*Primary Examiner* — Abdullah Al Kawsar
*Assistant Examiner* — Jun Kwon
(74) *Attorney, Agent, or Firm* — Nicholson De Vos Webster & Elliott LLP

(57) ABSTRACT

Techniques are provided for using machine learning techniques to learn embeddings for content items. In one technique, training data is used to learn embeddings for each attribute value of multiple attribute values of multiple content items, embeddings for each attribute value of multiple attribute values of multiple entities, and weights for a set of contextual features. In response to receiving a content request, a content item that is associated with one or more targeting criteria that are satisfied based on the content request is identified. A first set of embeddings for the content item are identified, a requesting entity that initiated the content request is identified along with a second set of embeddings for the requesting entity, and a set of feature values for the set of contextual features is identified. The content item is selected based on the sets of embeddings, the set of feature values, and the weights.

8 Claims, 9 Drawing Sheets

EMBEDDED LEARNING FOR RESPONSE PREDICTION IN CONTENT ITEM RELEVANCE

CROSS-REFERENCE TO RELATED APPLICATIONS

This application is related to U.S. application Ser. No. 15/855,912, filed Dec. 27, 2017 the entire contents of which is hereby incorporated by reference as if fully set forth herein.

TECHNICAL FIELD

The present disclosure relates to machine learning and, more particularly, to generating a prediction model based on learned latent representations for attributes of entities and content items. SUGGESTED CLASSIFICATION: 706/025; SUGGESTED ART UNIT: 2122.

BACKGROUND

The Internet allows end-users operating computing devices to request content from many different publishers. Some publishers desire to send additional content items to users who visit their respective websites or who otherwise interact with the publishers. To do so, publishers may rely on a content delivery service that delivers the additional content items over one or more computer networks to computing devices of such users. Some content delivery services have a large database of content items from which to select. It is difficult for a content provider to intelligently select (ahead of time) which of many content items should be delivered in response to each request from a publisher or a computing device of a user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for using machine learning techniques to predict entity interaction with content items are provided. A goal is to automatically learn latent representations (embeddings) of attribute values of both entities (users) and content items in order to better model interactions in content item relevance. Example entity interactions include a click of a content item, a like or share of a button associated with a content item, or a viewing of a video.

For each candidate content item that is identified in a content item selection event, latent representations of values of attributes of the content item are features in a first neural network to generate an output embedding for the content item. Similarly, latent representations of values of attributes of a user that is a target of the content item selection event are features in a second neural network to generate an output embedding for the user. The output embeddings of the content items and the user are used to determine which content item(s) to select for presentation to the user.

This approach to automatically learning latent representations of different attribute values and generating embeddings therefrom improves the accuracy of predicted entity selection rates, resulting in identifying more relevant content items for presentation to requesting entities. Another computer-related improvement as a result this approach is that the performance of the prediction model improves for entities that have little to no online history with the content delivery system. Another computer-related improvement is that the embeddings and weights may be learned much faster since much fewer features are required in order to achieve a similar level of prediction accuracy.

System Overview

Figure 1:
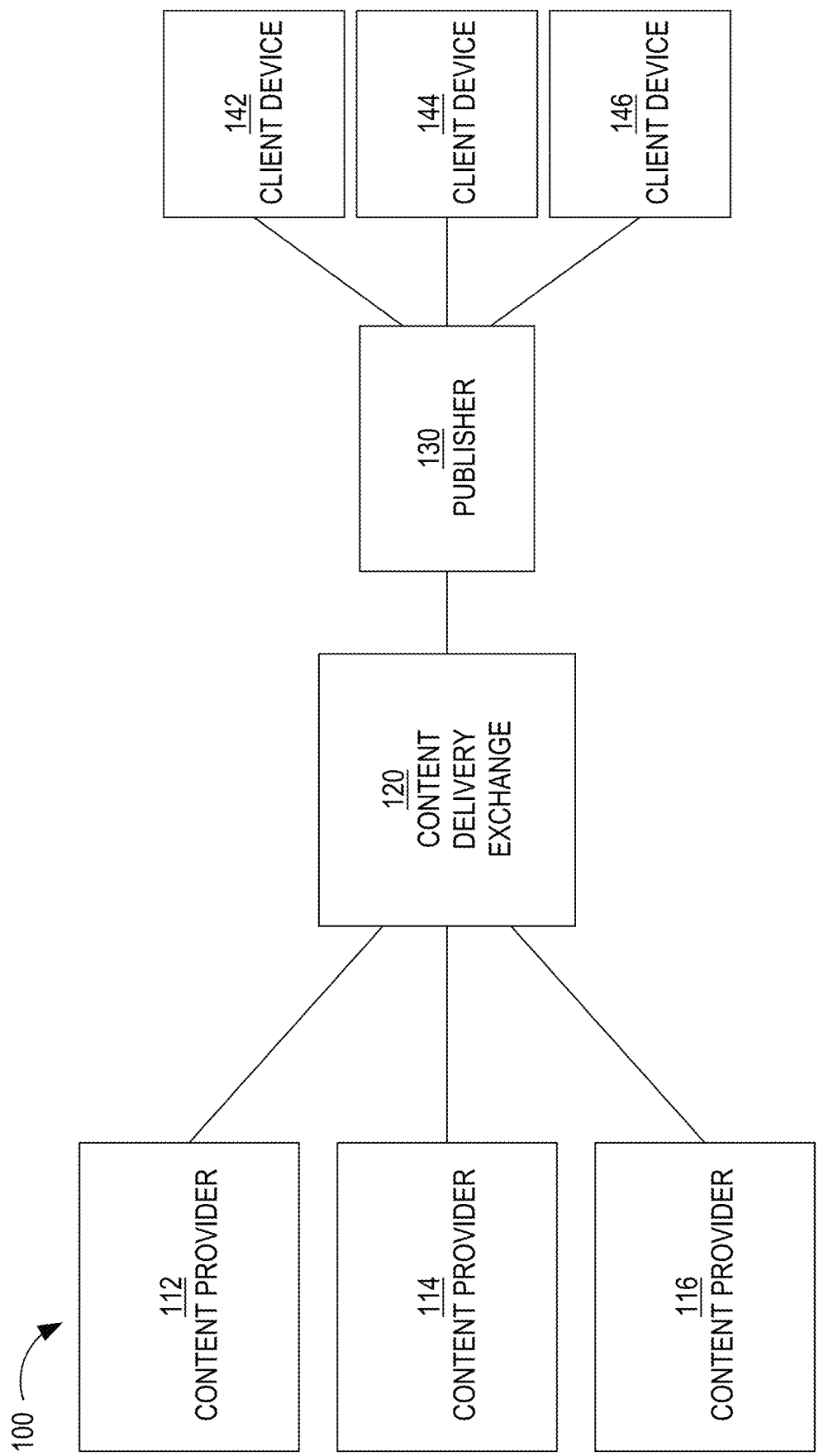
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual users or members of an online service.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR (or pCTR) of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item summaries, across client devices 152-156 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a content item that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item, content delivery system 120 may calculate a CTR for the content item.

Process Overview

Figure 2:
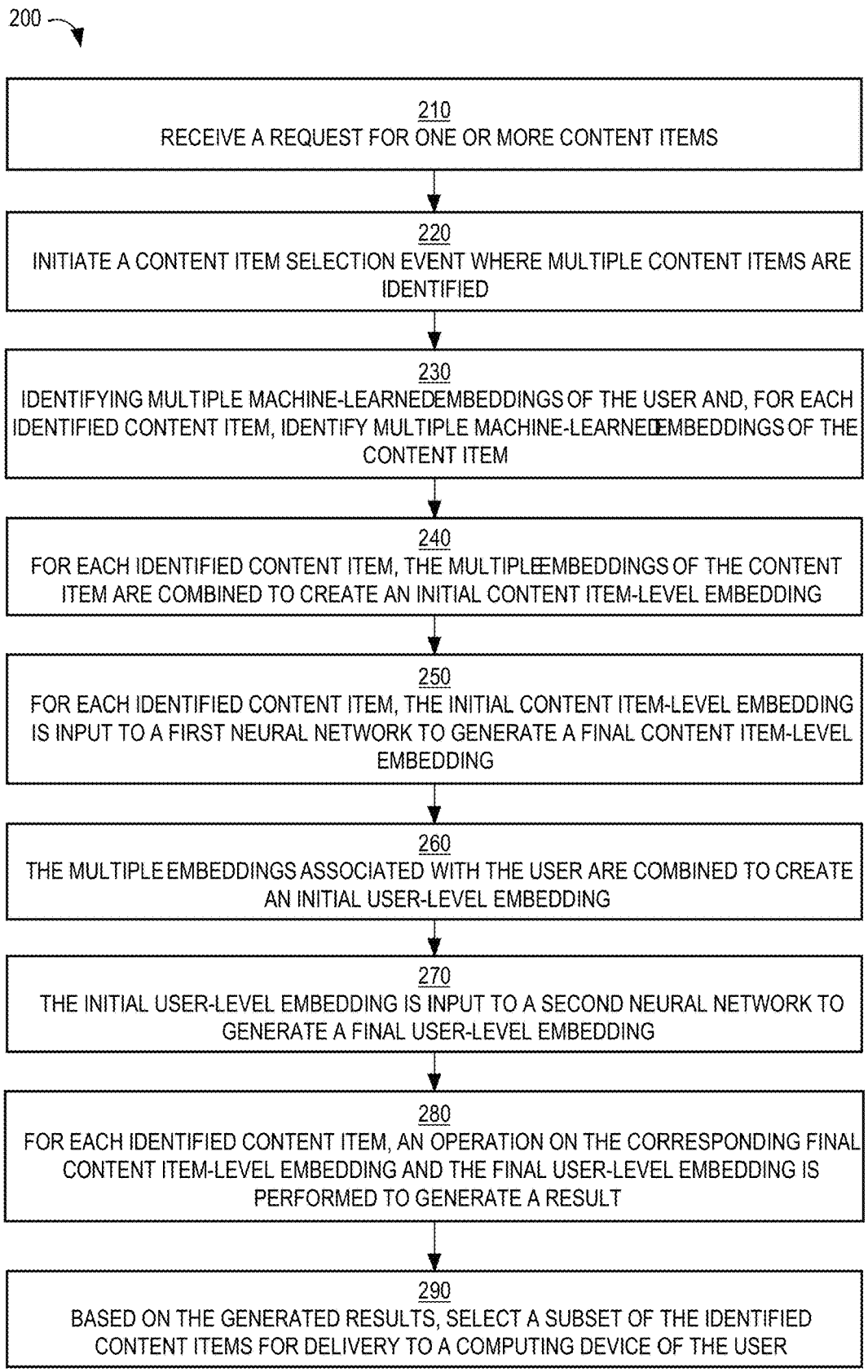
FIG. 2 is a flow diagram that depicts a process for leveraging a machine-learned prediction model to predict a user selection rate of a content item, in an embodiment.

FIG. 2 is a flow diagram that depicts a process 200 for leveraging a machine-learned prediction model to predict a user selection rate of a content item, in an embodiment. Process 200 may be implemented by content delivery exchange 120.

At block 210, a request for one or more content items is received. The request is initiated by a computing device (e.g., client device 110) that is operated by a requesting entity or user. The request may have been generated and transmitted when the computing device loaded a web page that includes code for generating the request. The web page may be provided by a server that is in the same domain or network as content delivery exchange 120.

At block 220, a content item selection event is initiated and multiple content items are identified. Content items are associated with targeting criteria and, in order to be identified in block 220, the targeting criteria of a content item should be satisfied (at least partially). If a content delivery campaign includes multiple content items, then the multiple content items may share the same targeting criteria. Alternatively, two or more content items belonging to the same content delivery campaign may be associated with different targeting criteria relative to each other. If no targeting criteria of any content item is satisfied, then default content items may be identified or randomly selected.

At block 230, multiple machine-learned embeddings of the user are identified and, for each identified content item, multiple machine-learned embeddings of the content item are identified. A machine-learned embedding is a vector of real numbers and represents a word or identifier. How embeddings are generated is described in more detail below.

Each machine-learned embedding corresponds to a value of an attribute (or attribute value). Example attributes of a content item include content provider identifier (that uniquely identifies a content provider that provided the content delivery campaign that includes the content item), campaign identifier (that uniquely identifies the content delivery campaign), and content item identifier (that uniquely identifies the content item). Each identifier may be globally unique or at least unique within the attribute to which the identifier pertains. Additionally or alternatively, an identifier may be a name (e.g., company=LinkedIn) or may be an identifier (e.g., whether numeric or alphanumeric) that has been mapped to the name (e.g., company=12345).

Example attributes of a user include an employer, a job title, a skill, and industry. Again, the corresponding attribute values may be actual names (e.g., "Software Engineer" for job title or "Finance" for industry) or may be identifiers to which the names have been mapped.

Block 230 may involve first identifying attribute values of a content item (e.g., from a content item database) and attribute values of a user (e.g., from a profile database) and then using one or more mappings or tables to identify, for each identified attribute value, a machine-learned embedding that correspond to that attribute value.

Figure 3A:
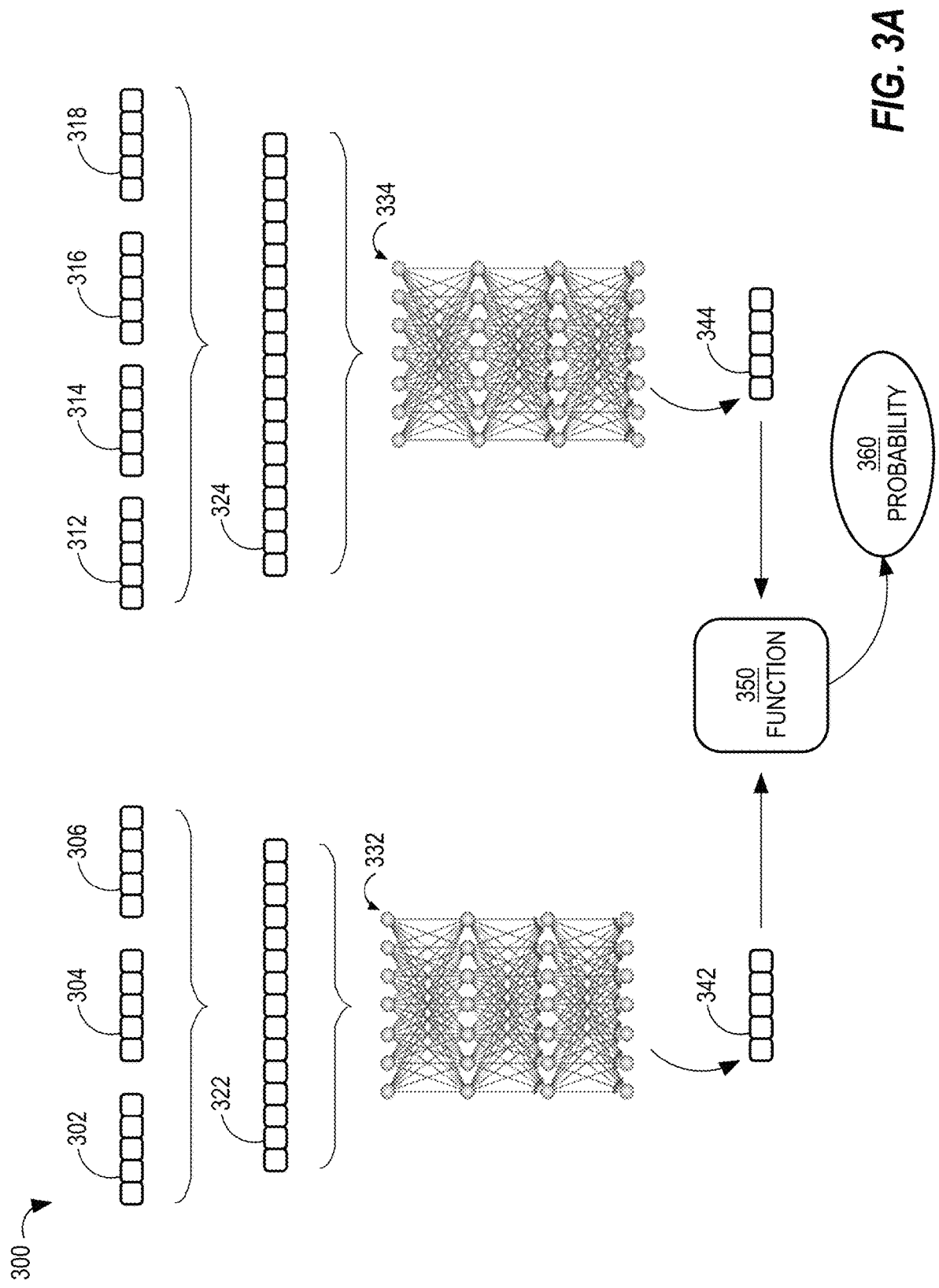
FIGS. 3A-3B are block diagrams, each of which depicts input embeddings and output embeddings of a selection prediction model that includes multiple artificial neural networks, in an embodiment.

FIG. 3A is a block diagram that depicts input embeddings 302-318 and output embeddings 342 and 344 of a selection prediction model 300 that includes neural networks 332 and 334, in an embodiment. Input embeddings 302-306 are learned embeddings for different attribute values of a content item. Input embedding 302 corresponds to a particular content provider, input embedding 304 corresponds to a particular content delivery campaign, and input embedding 306 corresponds to a particular content item.

Input embeddings 312-318 are learned embeddings for different attribute values of a user. Input embedding 312 corresponds to a particular employer or organization, input embedding 314 corresponds to a particular job title, input embedding 316 corresponds to a particular skill, and input embedding 318 corresponds to a particular industry. Other embodiments may include more or less embeddings. For example, one embodiment may exclude industry as an attribute while another embodiment may include academic institution and degree earned as additional attributes in which embeddings will be learned. In an embodiment, a vector size of an input embedding is between five and fifty dimensions or values.

Although input embeddings 302-318 are depicted as being vectors of size five, actual embeddings may be vectors of a larger size, such as twenty.

At block 240, for each identified content item, the multiple embeddings of the content item are combined to create an "initial" content item-level embedding. The combining may involve concatenating the individual embeddings of the attributes of the content item.

In FIG. 3A, input embeddings 302-306 are combined to generate initial content item-level embedding 322.

At block 250, for each identified content item, the corresponding initial content item-level embedding is input to a first neural network that comprises an input layer, one or more hidden layers, and an output layer. The first neural network may be a fully-connected network. In an embodiment, the first neural network has two hidden layers. The output layer produces "final" content item-level embedding, which is a vector of real numbers of a particular size. In an embodiment, the vector size of the final embedding is between 150 and 350.

In FIG. 3A, initial content item-level embedding 322 is input to neural network 332. Although neural network 332 is depicted as having two hidden layers and six nodes in each layer, neural network 332 may have any number of hidden layers and nodes in the hidden layers. For example, in an embodiment, neural network 332 comprises three layers: one layer for content item-level embedding 322, one layer for the network itself, and one layer for the final content item-level embedding and the number of nodes in the inner layer is one hundred.

The number nodes in the input layer need not be the same as the size of the input embedding. Similarly, the number nodes in the output layer need not be the same as the size of the output embedding.

A result of inputting initial content item-level embedding 322 into neural network 332 is a final content item-level embedding 342. Although final content item-level embedding 342 is depicted as being a vector of size five, an actual output embedding may be a vector of a larger size, such as ten.

At block 260, the multiple embeddings associated with the user are combined to create an "initial" user-level embedding. The combining may involve concatenating the individual embeddings of the attributes of the user. The size of an initial user-level embedding may be larger or smaller than each content item-level embedding. Such a difference in size may be due to the number of content item attributes that are considered (e.g., 3) being different than the number of user attributes that are considered (e.g., 4). Alternatively, the size of individual embeddings of content item attributes (e.g., 8) may be different than the size of individual embeddings of user attributes (e.g., 10).

In FIG. 3A, input embeddings 312-318 are combined to generate initial user-level embedding 324.

At block 270, the initial user-level embedding is input into a second neural network that also comprises an input layer, one or more hidden layers, and an output layer. The second neural network may also be a fully-connected network. The output layer produces a "final" user-level embedding, which is a vector of the same size as the vector produced by the output layer of the first neural network. While the second neural network is utilized once for each content item selection event, the first neural network is utilized multiple times for each content item selection event, once for each identified (or candidate) content item.

In FIG. 3A, initial user-level embedding 324 is input to neural network 334. Although neural network 334 is depicted as having two hidden layers and six nodes in each layer, neural network 334 may have any number of hidden layers and nodes in the hidden layers. A result of inputting initial user-level embedding 324 into neural network 334 is a final user-level embedding 344. Although final user-level embedding 344 is depicted as being a vector of size five, an actual output embedding may be a vector of a larger size, such as twenty.

At block 280, for each identified content item, an operation on the output of the first neural network (i.e., final content item-level embedding) and the output of the second neural network (i.e., the final user-level embedding) is performed to generate a result. The operation may be a dot product, difference, or summation. The more similar the outputs of the respective neural networks, the more likely the corresponding user will select (or otherwise interact with) the corresponding content item. Any similarity can be used as a signal for down-stream interaction (e.g., selection). As a specific example, $1/(1-e^{\char`\^}-(L1*L2))$ is computed, where L1 is the final content item-level embedding produced by the first neural network, L2 is the final user-level embedding produced by the second neural network, and '*' is a dot product operation. The result of this computation reflects a probability that the user corresponding to L2 will select the content item corresponding to L1.

In FIG. 3A, final content item-level embedding 342 and final user-level embedding 344 are input to function 350, which includes one or more operations (e.g., a dot product operation, a division operation, an addition operation) and one or more constants (e.g., '1' and 'e'). An output of function 350 is probability 360, which indicates a likelihood that the user will select the content item corresponding to final content item-level embedding 342. Probability 360 may be an actual probability, may be used to rank the content items, and/or may be used as a feature in another pCTR model, depending on the downstream application.

At block 290, based on the generated results, one or more of the identified content items are selected for delivery to the computing device of the user. In some cases, a content item selection event may result in selecting a single content item for presentation, while, in other cases, a content item selection event may result in selecting multiple content items for presentation. The results of block 280 may be one of many factors that are considered when selecting a content item. For example, a bid price of each identified content item may be another factor in determining which content item(s) to select for presentation.

In an embodiment, final content item-level embeddings and/or final user-level embeddings are stored and retrieved later when the corresponding content items and/or users are identified in future content item selection events. For example, if content item A is identified in a first content item selection event and a final content item-level embedding is generated for content item A, then that final content item-level embedding is stored in association within content item A. Later, during a second content item selection event, content item A is identified again and the final content item-level embedding is retrieved from storage without having to construct an initial content item-level embedding and feed that embedding into the first neural network to generate the final content item-level embedding. Thus, blocks 230-270 may be replaced with retrieval, from storage, of a final user-level embedding and of final content item-level embeddings of the content items identified in block 220.

In an embodiment, final content item-level embeddings and/or final user-level embeddings are generated prior to (rather than in response to) a content request, processing of which would require one or more of the final embeddings. For example, a final user-level embedding is generated for each of multiple users soon after a machine learned prediction model (comprising multiple artificial neural networks) is generated. The multiple users may be users who are known to have selected a content item in the recent past or otherwise initiated content item selection events in the recent past. As another example, a final content item-level embedding is generated for each of multiple content items soon after the machine-learned prediction model is generated. The multiple content items may be content items that have been candidates in content item selection events in the recent past.

Embeddings

An embedding is a vector of real numbers. "Embedding" is a name for a set of feature learning techniques where words or identifiers are mapped to vectors of real numbers. Conceptually, embedding involves a mathematical embedding from a space with one dimension per word/phrase (or identifier) to a continuous vector space.

One method to generate embeddings includes artificial neural networks. In the context of linguistics, word embedding, when used as the underlying input representation, have been shown to boost performance in natural language processing (NLP) tasks, such as syntactic parsing and sentiment analysis. Word embedding aims to quantify and categorize semantic similarities between linguistic items based on their distributional properties in large samples of language data. The underlying idea that a word is characterized by "the company it keeps."

In an embodiment, in the context of content item selection, an embedding is learned for each of multiple content item attribute values and each of multiple user attribute values. Such attribute values may be string values or numeric identifiers. For example, a content item attribute includes content provider, which, for a particular content item, may be a name (e.g., string of non-numeric characters) of the content provider (e.g., "Company X") or an identifier (e.g., "435256") that uniquely identifies the content provider.

Each embedding represents something different. For example, an embedding for a particular employer (which embedding is used to generate an initial user-level embedding) represents behavior of employees of the particular employer when responding to selectable content items (e.g., whether clicking the content items or not). Similarly, an embedding for a particular job title (which embedding is used to generate an initial user-level embedding) represents behavior of users with that particular job title when responding to selectable content items. As another example, an embedding for a particular content provider (which embedding is used to generate an initial content item-level embedding) represents user behavior towards selectable content items provided by the particular content provider. Similarly, an embedding for a particular content delivery campaign (which embedding is used to generate an initial content item-level embedding) represents user behavior towards selectable content items that belong to that particular content delivery campaign.

The training data that is used to generate or "learn" embeddings for different attribute values comprises a portion of the user interaction data described previously. In order to generate the training data, the original user interaction data may have been augmented with additional information and/or may have been filtered to remove unnecessary data, such as timestamp data. For example, given a click data item that includes a user/member identifier, the user identifier is used to look up, in a profile database, a profile and retrieve one or more data items from the profile, such as one or more most recent job titles, one or more skills, and an industry. If the retrieved attribute values are names and not identifiers, then each retrieved attribute value name may be used to lookup, in a mapping (e.g., "'Software Engineer'→87654"), a unique internal identifier that is mapped to the retrieved attribute value name. As another example, given an impression data item that includes a content item identifier, the content item identifier is used to look up, in a content item database, a record that includes a campaign name (or identifier) and/or a content provider name (or identifier).

Thus, each training instance indicates multiple content item-related attribute values and multiple user-related attribute values. Content item-related attribute values include a content item identifier that uniquely identifies a content item, a content delivery campaign identifier that uniquely identifies a content delivery campaign to which the content item belongs, a content provider identifier that uniquely identifies a content provider that initiated or created the content delivery campaign.

User-related attribute values include: a user identifier that uniquely identifies a user (e.g., a member of a social network), one or more employer identifiers, each of which uniquely identifies an employer that the user may have specified in his/her profile; one or more job title identifiers, each of which uniquely identifies a job title that the user may have specified in his/her profile; one or more skill identifiers, each of which uniquely identifies a skill that the user may have specified in his/her profile; and an industry identifier that uniquely identifies an industry that the user may have specified in his/her profile or that may have been derived based on a job title (and/or other information) associated with the user.

Each training instance also indicates whether the indicated content item was selected or otherwise interacted with by the indicated user. For example, a '1' may indicate that the corresponding user "clicked" on the corresponding content item and a '0' may indicate that the corresponding user did not click on the corresponding content item. In practice, very few content items are selected by a user, such as under 0.4%. One way to deal with imbalanced labels is to downsample the negative samples. A more effective way to deal with imbalanced labels is to upsample the positive samples. Additionally or alternatively, positive samples may be weighted more than negative samples through weighted regularization, weighted costs functions or other approaches.

The user interaction data upon which the training data is based may be limited to user interaction data that was generated during a certain time period, such as the last fourteen days.

In training multiple artificial neural networks, embeddings for attribute values that are indicated in the training data may be initialized to random numbers at the beginning. During the training process, each embedding is continuously modified until the embedding "stabilizes", such that the object value that is being optimized stops significantly improving. Training may be performed in small batches and embeddings may be updated after each batch. A stabilized embedding becomes a "final" embedding for the corresponding attribute value. A final embedding and its corresponding attribute value may be stored in a mapping or table of multiple final embeddings. For example, one table may store associations between final embeddings and attribute values pertaining to content providers and another table may store associations between final embeddings and attribute values pertaining to job titles.

The training process involves gradient descent and backpropagation. Gradient descent is an iterative optimization algorithm for finding the minimum of a function; in this case, a loss function. Backpropagation is a method used in artificial neural networks to calculate the error contribution of each neuron after a batch of data is processed. In the context of learning, backpropagation is used by a gradient descent optimization algorithm to adjust the weight of neurons (or nodes) in a neural network by calculating the gradient of the loss function. Backpropagation is also referred to as the "backward propagation of errors" because the error is calculated at the output and distributed back through the network layers. For models involving embeddings, there is an implicit input layer that is often not mentioned. The embeddings are actually a layer by themselves and backpropagation goes all the way back to the embedding layer. The input layer maps inputs to the embedding layer. Backpropagation begins at the final (output) layer that generates the probabilities and is applied per batch. Batch size depends on several factors, including the available memory on the computing device or GPU.

The input layer for a particular attribute (e.g., industry of a user) is a hot encoding that comprises all zeros except for a single one value representing the attribute value. For example, if there are three industries, then each hot encoding for the industry attribute is three values in length. For example, if the industries are Technology, Food, and Retail, then a hot encoding for Technology may be {1, 0, 0}, a hot encoding for Food may be {0, 1, 0}, and a hot encoding for Retail may be {0, 0, 1}. For the attribute skills, if there are one thousand possible skills, then a hot encoding for each skill is a thousand entries in length.

Figure 4:
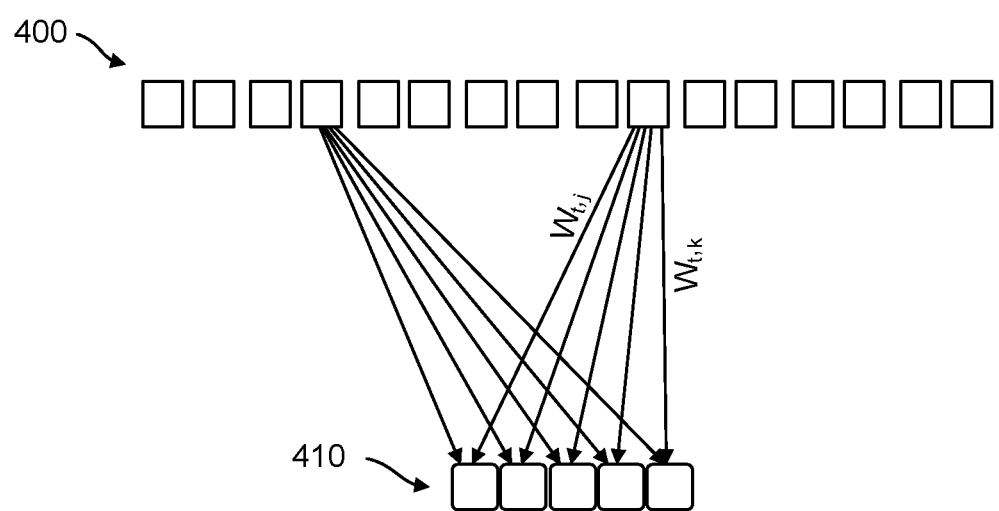
FIG. 4 is a diagram that depicts an example hot encoding, in an embodiment.

FIG. 4 is a diagram that depicts an example hot encoding 400, in an embodiment. Hot encoding 400 includes sixteen entries, one for each of sixteen possible values, such as industries. Hot encoding 400 includes a 1 for only one entry and a zero for the remaining entries. Thus, for example, each industry is associated with a different hot encoding. Each index to a '1' entry of a hot encoding is associated with five weights, which are learned using the machine learning techniques described herein. Thus, each industry is associated with a different set of five weights. The five weights learned for a particular industry become the embedding 410 of that industry.

After generating embeddings for different attribute values of different attributes during the training process, the embeddings are associated with their respective attribute values. For example, an embedding for a first content provider is stored in association with the first content provider (such as a unique content provider identifier). Similarly, an embedding for a particular skill (e.g., "Cloud Computing", which may be mapped for a particular internal identifier that represents that skill) is stored in association with that particular skill.

Later, when a content request is received that is initiated by a particular user, embeddings of attribute values of the particular user are retrieved, along with embeddings of attribute values of one or more content items that are candidates for presentation to the particular user. For example, a content request may include a user/member identifier that is used to lookup a profile of the particular user in a profile database. As part of the lookup, certain attribute names are used in the lookup, such as "Job Title", "Employer", etc. The corresponding attribute values are retrieved from the profile. One or more mappings of attribute values to their respective embeddings are accessed to determine the embeddings of the retrieved attribute values. As noted previously, there may be a separate mapping or table for each attribute. For example, one mapping is used for employer while another mapping is used for job title. The retrieved embeddings are then combined (e.g., concatenated) to generate an initial user-level embedding, which is input to the appropriate artificial neural network for users in order to generate, as output, a final user-level embedding.

On the content item side, a content request initiates a content item selection event where multiple content items from different content delivery campaigns are identified as candidate content items for presentation to a user. For each candidate content item, attribute values of the candidate content item are identified and, for each attribute value, an embedding is retrieved. Then, an initial content item-level embedding is generated for a candidate content item based on (e.g., by concatenating) the individual embeddings retrieved for the candidate content item. The content item-level embedding is then input into the appropriate artificial neural network for content items in order to generate, as output, a final content item-level embedding.

For each final content item-level embedding, that final content item-level embedding and the final user-level embedding are input to a function that performs one or more operations and generates a result. Thus, a different result is generated for each content item. The results are used to select a subset of the candidate content items. For example, the greater the value of a result, the greater the probability of the corresponding user selecting the corresponding content item. The value of each result may be one of multiple features that are considered in selecting a subset of the candidate content items. For example, the generated results may be input into another machine-learned prediction model that is used to select a subset of the candidate content items.

Multiple Values for a Single User Attribute

In an embodiment, a user is associated with multiple values of a particular attribute. For example, a user might have been employed by multiple companies (whether concurrently or serially over time), might have multiple job titles (whether concurrently or serially over time), and might have multiple skills. When generating a user-level embedding, if a user has multiple values of a particular attribute, then the embeddings associated with the multiple values are combined before combining (e.g., concatenating) the embedding associated with that particular attribute with embeddings associated with attribute values of other attributes. For example, a user has been employed by multiple employers over time. An embedding associated with each employer is identified. Each embedding is a vector comprising multiple ordered entries, each entry containing a real number.

The maximum, average, median, or minimum of each entry relative to other entries in other embeddings of the same index is determined. For example, for a result embedding that is generated based on a set of embeddings of a particular attribute, the first entry in the result embedding will contain the maximum value of the first entries of the embeddings in the set of embeddings; the second entry in the result embedding will contain the maximum value of the second entries of the embeddings in the set of embeddings; the third entry in the result embedding will contain the maximum value of the third entries of the embeddings in the set of embeddings; and so forth. Such a process is referred to as "max pooling." A similar process may be performed where, instead of finding the maximum value, the median value or the mean value is computed for each entry in the result embedding.

Figure 3B:
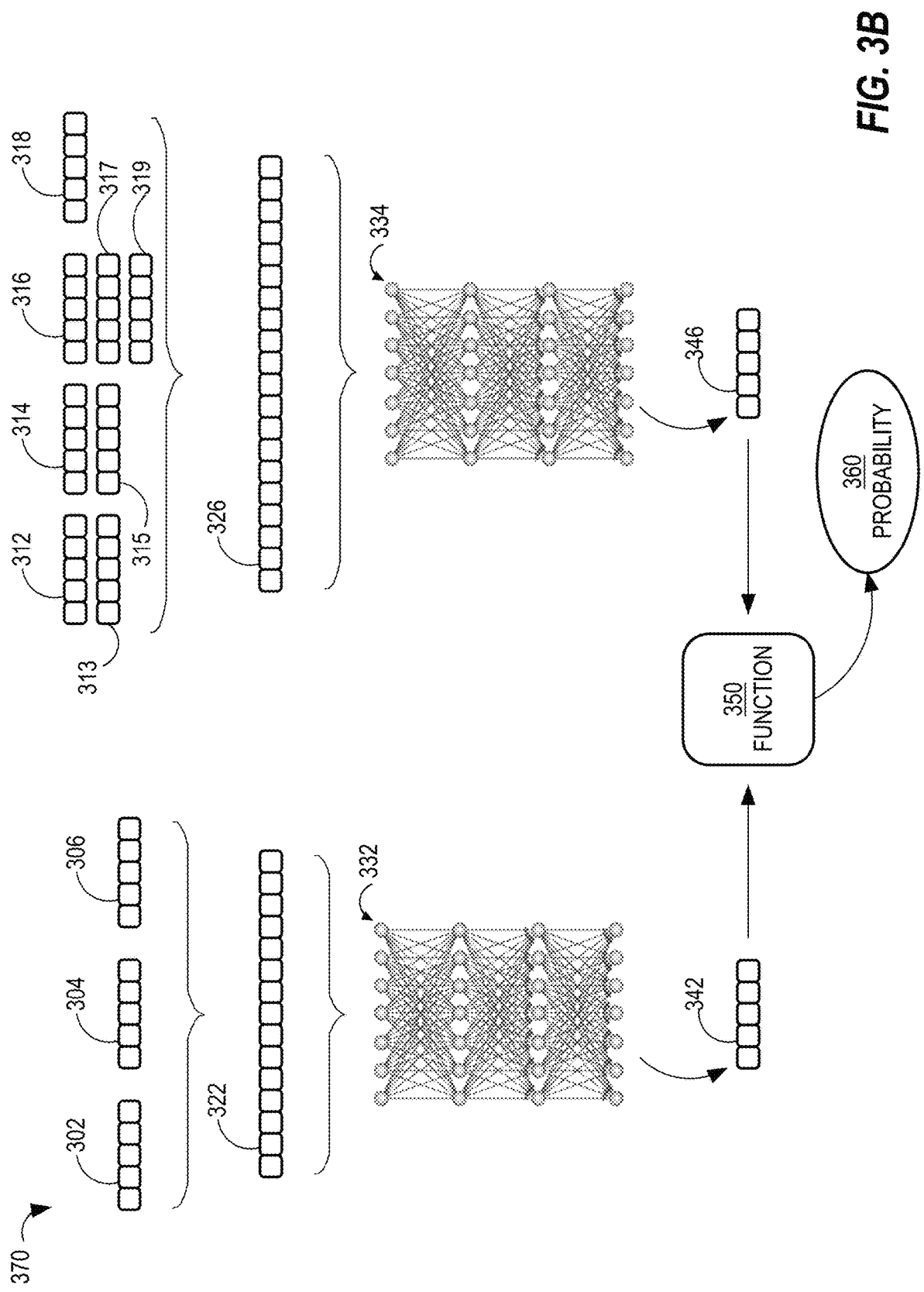

FIG. 3B is similar to FIG. 3A except that a user is associated with multiple attribute values for each of multiple attributes. For example, the user may have been employed by two different organizations in the last two years, the user may have had two different job titles working at the same organization, and the user may have three skills listed on his/her public profile. Thus, embeddings 312 and 313 may be embeddings that were learned for different employers, embeddings 314 and 315 may be embeddings that were learned for different job titles, and embeddings 316, 317, and 319 may be embeddings that were learned for different skills. One or more techniques (e.g., max pooling) may be used to combine or collapse the multiple embeddings of a single attribute into a single embedding, which is used to generate initial user-level embedding 326, which is used to produce final user-level embedding 346.

Missing Embeddings

In an embodiment, embeddings for one or more attribute values are missing for a content item or a user. An embedding may not be available for an attribute value if an embedding has not yet been learned for the attribute value. For example, no embedding has yet been learned for a new content item that was created in the last 24 hours. Similarly, no embedding has yet been learned for a new content delivery campaign. As another example, a particular skill, job title, or employer may be new, in which case no embedding will have been learned for that attribute value.

In this embodiment, if no embedding exists for an attribute value, then a random embedding is generated. Alternatively, if the missing embedding is for a new content item, then embeddings of other content items from the same content delivery campaign (to which the new content item belongs) may be combined (e.g., averaged, median determined, or maximum determined) to generate a combined content item embedding. The combined content item embedding is used for the new content item until a machine-learned embedding is generated for the new content item. The combined content item embedding is then combined (e.g., concatenated) with one or more other attribute values of the content item to generate a content item-level embedding.

If a missing embedding is for a new content delivery campaign, then embeddings of other content delivery campaigns from the same content provider (that has initiated the new content delivery campaign) may be combined (e.g., averaged, median determined, or maximum determined) to generate a combined campaign embedding. The combined campaign embedding is used until a machine-learned embedding is generated for the new content item. The combined campaign embedding is then combined (e.g., concatenated) with one or more other attribute values of the corresponding content item to generate a content item-level embedding.

If a missing embedding is for a new content provider, then embeddings of other content providers may be combined (e.g., averaged, median determined, or maximum determined) to generate a combined content provider embedding. The combined content provider embedding is used until a machine-learned embedding is generated for the new content provider.

If a missing embedding is for a new job title, then embeddings of job titles that are considered similar to the new job title may be combined. A similar job title may be one that has similar words or meanings as the new job title. A similar process for new skills may be followed.

In some scenarios, a user might not fill in his/her profile with sufficient information, such that one or more attribute values are missing. For example, a user might not specify any skills (or might specify very few skills) in her profile. Skills of the user may be inferred by determining the most frequently specified skills in profiles of users (a) with the same job title, (b) at the same employer, and/or (c) who are connected to the user in a social network. The top N (e.g., two or three) of those skills are associated with the user (though not included in the user's profile) and embeddings of those top N skills are retrieved and user to generate a user-level embedding for the skill attribute.

As another example, a user might not specify an industry in his/her profile. An industry of the user may be inferred by determining the most common specified industry in profiles of users (a) with the same job title, (b) at the same employer, and/or (c) who are connected to the user in a social network. The top N (e.g., one, two, or three) of those industries are associated with the user (though not included in the user's profile) and embeddings of those top N industries are retrieved and user to generate a user-level embedding for the industry attribute.

Deep and Wide Model

One downside of the above approaches is that the contextual features are not taken into account separately from the embeddings of the different content item features and from the embeddings of the different user features. If the embeddings are learned without taking into account these contextual features, then the embeddings are not learned properly and will be biased.

In an embodiment, a prediction of a user response takes into account features other than the content item features and the user features described previously. Examples of such other features are contextual features, such as time (e.g., a binarized feature set indicating time of the week), device type (e.g., Android, iOS), channel (e.g., mobile, desktop, tablet), channel.time (interaction of channel and time), channel.position (interaction of channel and position of the content item), user.bucket (bucketed user segment feature based on demographics), time.user.bucket (interaction of user segment and time bucket), company.feature.company_size (a bucketed binary feature for the size of the company of the content item), company.feature.company follower (a hot encoding for bucketed feature indicating a number of followers a company has), company.feature.company industry (a hot encoding for industry of the company to which the user belongs). One or more of these features may be represented as a multinomial one-hot encoded feature. For example, all discrete valued features are one-hot encoded, meaning that each feature value is associated with a vector and the index of a vector corresponding the desired value is '1' and the others are '0.' The weights or coefficients for the contextual features are learned while the embeddings and the weights for the neural networks are learned. Such additional features cause the deep prediction models in FIGS. 3A and 3B to be wide prediction models.

Figure 5:
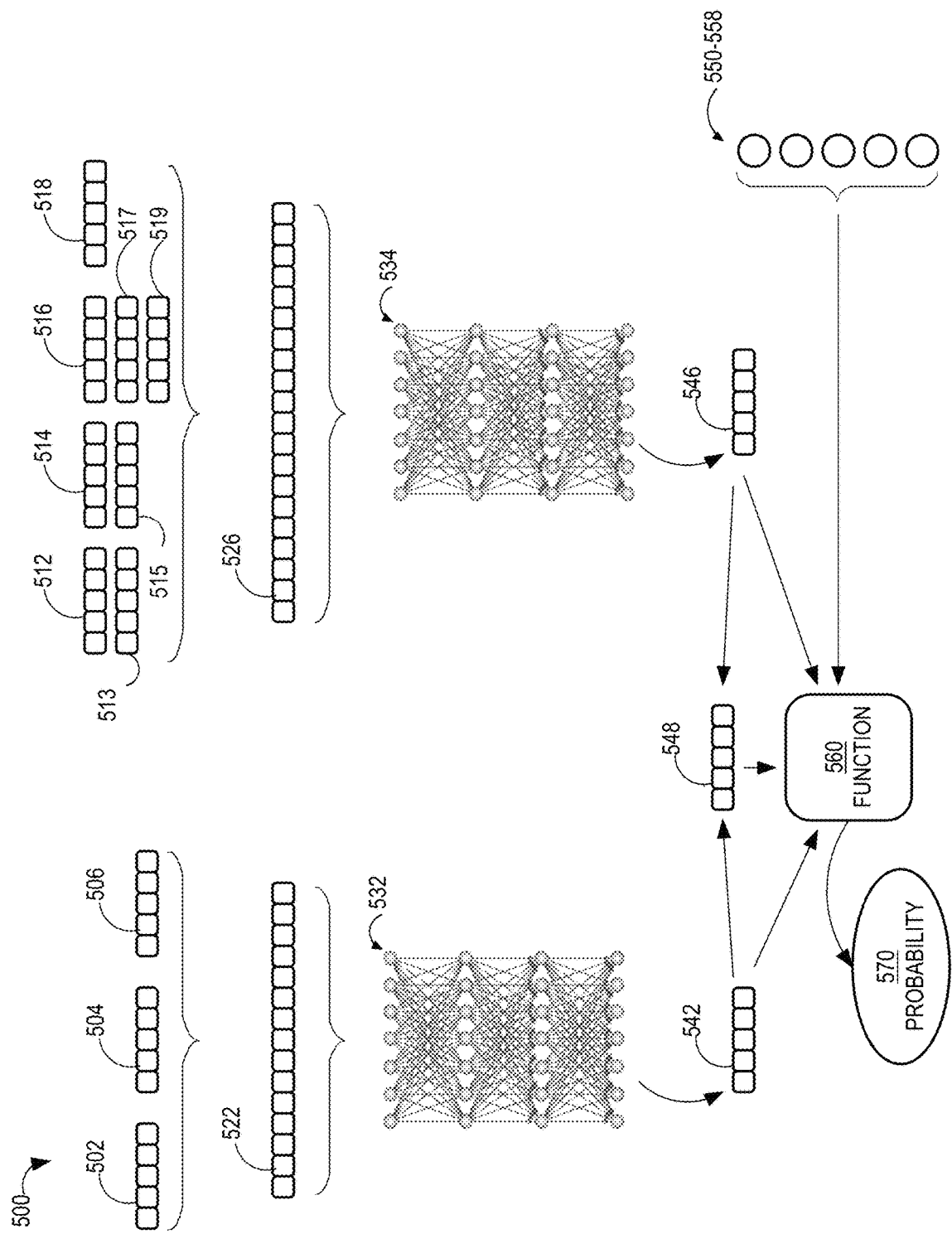
FIG. 5 is a block diagram that depicts a "deep" and "wide" prediction model, in an embodiment.

FIG. 5 is a block diagram that depicts a deep and wide prediction model 500, in an embodiment. Prediction model is based on the prediction models in FIGS. 3A and 3B. One difference is that output of prediction model 500 is based on a function 560 that accepts, as input: (1) final content item-level embedding 542; (2) final user-level embedding 546; (3) an element-wise product 548 of final content item-level embedding 542 and final user-level embedding 546; and (4) contextual feature 550-558. Although five contextual features are indicated in the figure, embodiments may include more or fewer contextual features than five. Artificial neural networks 532 and 534 comprise the "deep" part of prediction model 500 while contextual features 550-558 comprise the "wide" part of prediction model 500. Also, although four layers are depicted for each of ANNs 532 and 534, ANNs may comprise more or less layers and more or less artificial neurons in each layer.

Element-wise product 548 is a vector of values that has the same size as the input embeddings 542 and 546. An element-wise product of two vectors involves multiplying the value of each entry in one vector (embedding) by the value of the corresponding entry in the other vector and storing the result in the corresponding entry of an output vector. For example, the first entry in embedding 542 is multiplied by the first entry in embedding 546 to produce a value that is stored in the first entry of vector (embedding) 548.

Function 560 may be a logistic regression, such as a sigmoid function $\sigma(W_1*X+W_2*\theta)$ where $\theta=\{e_m, e_c, e_m*e_c\}$, $e_m$ is a final user-level embedding for user m, $e_c$ is a final content item-level embedding for content item c, $e_m*e_c$ is an element wise product of these two embeddings, X is a set of contextual feature values, $W_1$ is a set of machine-learned weights for the contextual features, and $W_2$ is a set of machine-learned weights for the three embeddings.

In learning the weights (e.g., $W_1$, $W_2$, and weights for different edges in the neural networks), initial values for the weights may be randomly selected. In this example, logistic regression is used to learn the weights. Logistic regression may also be used to learn weights for edges in ANNs 532 and 534. Alternatives to logistic regression include Decision Trees, Naïve Bayes, and support vector machines (SVMs).

An advantage of learning the user-level embeddings and the content-level embeddings separate from the weights of the contextual features is that the user-level embeddings and the content-level embeddings are not biased with the contextual features.

Another advantage of learning the user-level embeddings and the content-level embeddings separate from the contextual features is that, in a previous prediction model that relied on identifier-related features (such as content item identifier and content provider identifier), such identifier-related features are very sparse and the number of identifier features (~100K) is way more than the number of global features (~10K), such as industry, job title, employer name, etc. Because embodiments do not rely on such a multiple of identifier-related features, the training of the prediction model takes much less time.

Image Embeddings

An image of a content item may be helpful in predicting user selection, especially for relative new content items. The content of an image is a new source of information and may be used to improve the quality of a prediction model, such as one of the prediction models described herein.

However, learning image embeddings independent of user features might not yield favorable results. Different users may have different preferences over images. The next section describes a model that takes into account both online user interaction history and content items in order to learn a user-content item affinity model.

Image Embeddings Trained on User Interaction Data

Figure 6:
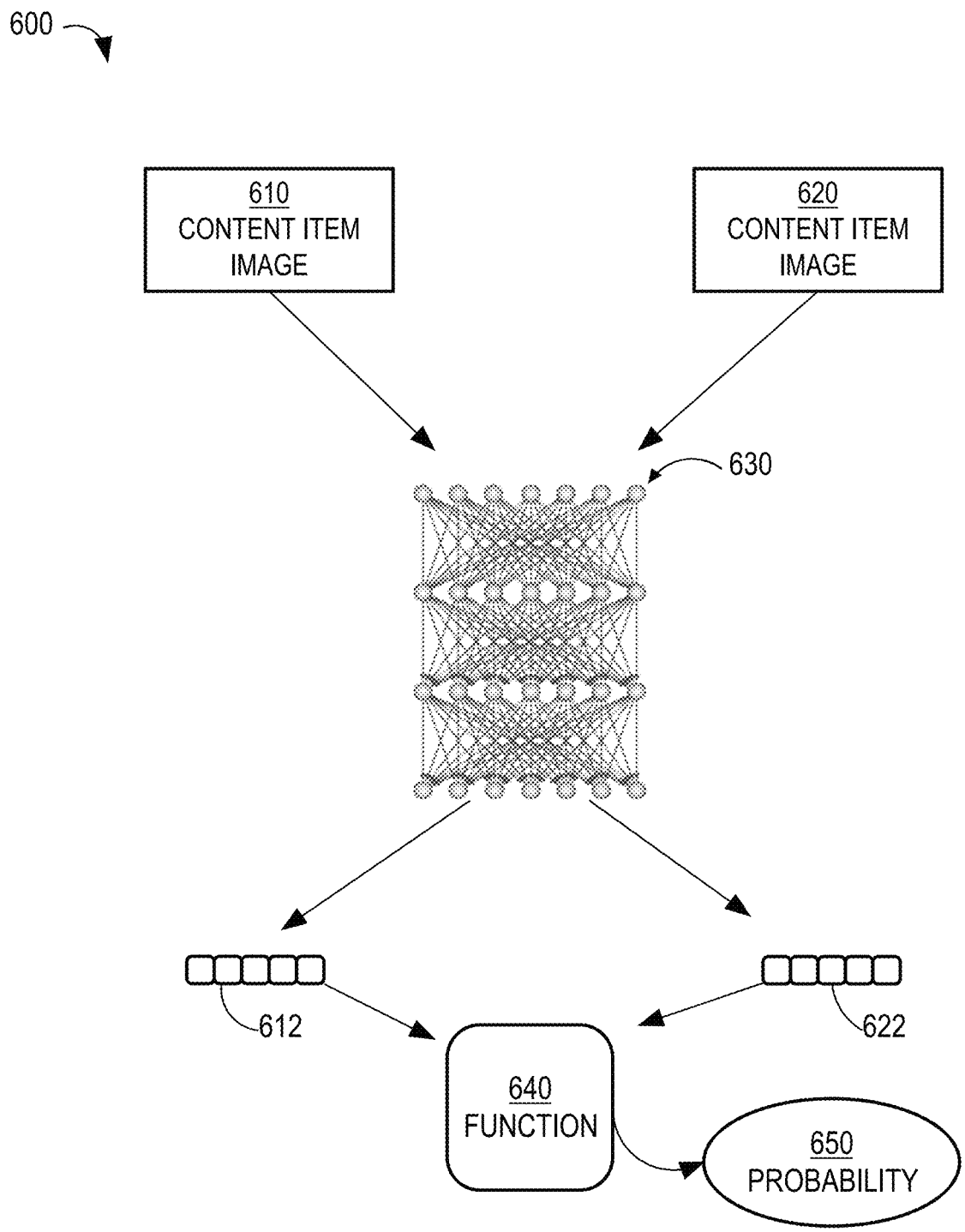
FIG. 6 is a diagram of a prediction model that generates a prediction of user interaction using an artificial neural network and image embeddings, in an embodiment.

FIG. 6 is a diagram of a prediction model 600 that generates a prediction of user interaction using an artificial neural network 630 and image embeddings 612 and 622, in an embodiment. Prediction model 600 includes artificial neural network (ANN) 630 that comprises multiple layers of artificial neurons, takes, as input, images, and generates image embeddings for the input images. Thus, ANN 630 takes, as input, a content item image 610 from a candidate content item generates image embedding 612. ANN 630 also takes, as input, a content item image 620 that is associated with a user that interacted with (e.g., clicked on) the corresponding content item and generates image embedding 622. Image embeddings 612 and 622 are input to function 640, which produces a probability 650.

In this embodiment, a user is represented by an aggregate of image embeddings of content items with which the user has previously interacted (e.g., clicked or viewed for a certain amount of time). If the user has only interacted with one content item, then only a single image embedding is generated for the user. However, if the user has interacted with multiple content items, then an image embedding for each content item may be generated and an aggregated operation (e.g., mean pooling, max pooling, min pooling, median pooling) is performed on the image embeddings to generate an aggregated image embedding for the user.

Thus, ANN 630 comprises multiple layers and produces image embedding 612 and image embedding 622, which are combined or aggregated to generate aggregated user image embedding 640.

In an embodiment, ANN 630 is a convolutional neural network (CNN) that has been trained to learn embeddings for images.

In a related embodiment, an existing CNN that has already been trained based on multiple images is used and retrained based on a new set of training data, such as user interaction data from a certain period of time (e.g., the last four weeks of user interaction data), including an impression data set and a click data set. Each training instance may comprise two image embeddings and a label indicating a click or no click (or view or no view in the case of video). The retraining may be limited to the last N layers (e.g., the last three layers) to learn embeddings that optimize for CTR or VTR (video through rate).

In an embodiment, each image embedding is determined based on a CNN that takes, as input, pixel values of an image and the output values of the CNN becomes the image embedding. Thus, the image embedding of a candidate content item and an image embedding of an image of a content item selected by a user leverage the same CNN. An example number of pixel values is 299×299×3, where 299 is the number of pixel rows, 299 is the number of pixel columns, and 3 indicates that there are 3 color values, such as one for red, one for green, and one for blue (or RGB).

During a content item selection event, a content item image embedding (e.g., image embedding 612) is retrieved for each candidate content item. Each content item image embedding may be pre-computed or may be computed during the content item selection event (i.e., in response to the content request that initiated the content item selection event). Similarly, during the content item selection event, an aggregated user image embedding (e.g., image embedding 622) is retrieved for the user that initiated the content item selection event. The aggregated image embedding may be pre-computed or may be computed during the content item selection event. For example, during the content item selection event, a user identifier is used to identify a set of images with which the corresponding user has interacted (e.g., clicked, liked, shared, etc.). Image embeddings may already have been pre-computed (using ANN 630) for each image in the set or may be computed "on-the-fly." The image embeddings are then aggregated to generate the aggregated user image embedding.

After the content item image embedding and the aggregated user image embedding are retrieved, function 640 is executed based on the respective image embeddings. The operation may be a dot product, difference, or summation. The more similar the outputs of the respective neural networks, the more likely the corresponding user will select (or otherwise interact with) the corresponding content item. Any similarity can be used as a signal for downstream interaction (e.g., selection). As a specific example, $1/(1+e^{\wedge}(L1*L2))$ is computed, where L1 is the image embedding 612 and L2 is the image embedding 622, and '*' is a dot product operation. The result of this computation reflects a probability that the user corresponding to L2 will select the candidate content item corresponding to L1.

Output of function 640 is probability 650, which indicates a likelihood that the user will select the content item corresponding to L1. Probability 650 may be an actual probability, may be used to rank the content items, and/or may be used as a feature in another prediction model, depending on the downstream application.

A "Deep" Prediction Model that Incorporates Image Embeddings

Figure 7:
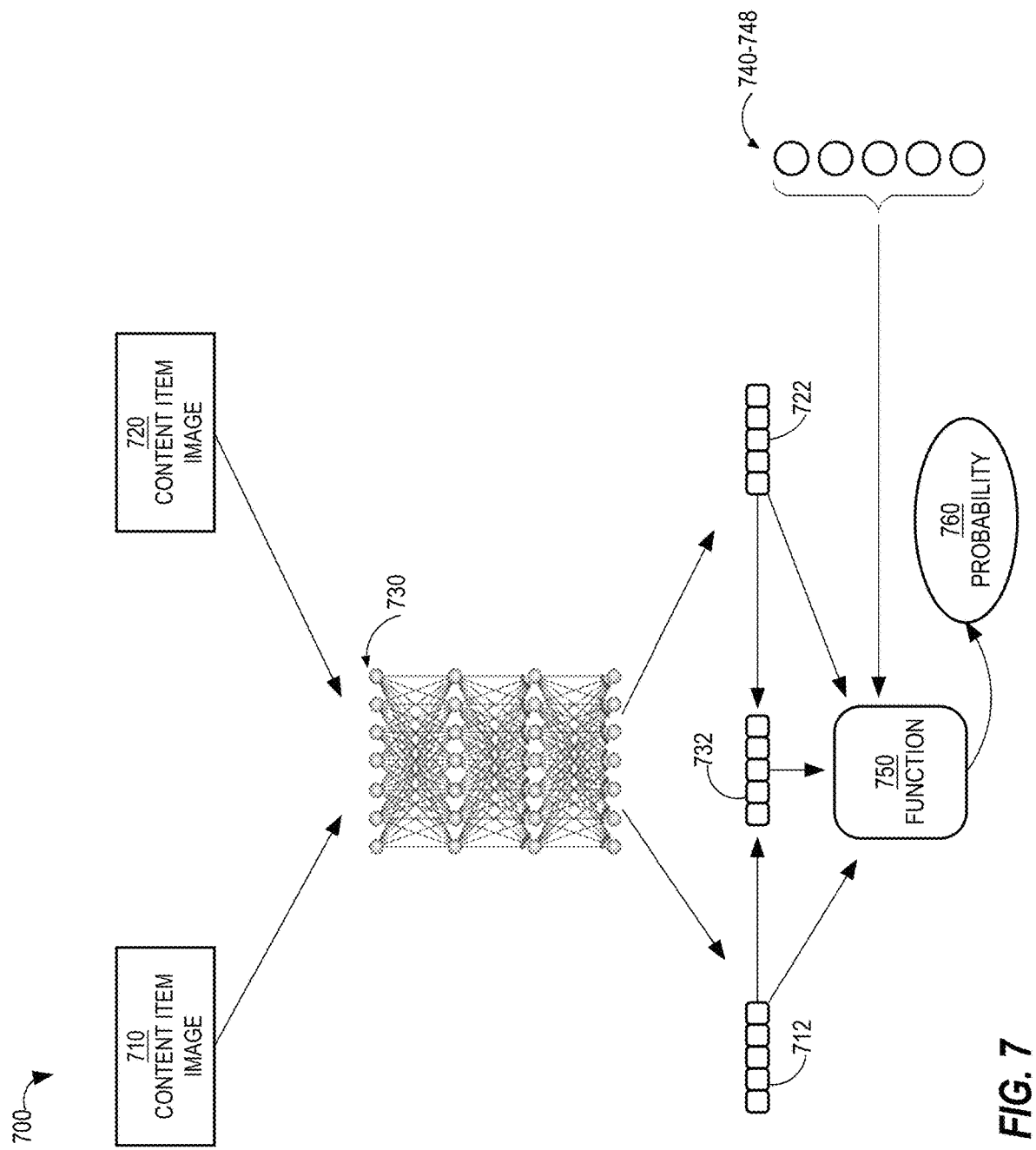
FIG. 7 is a block diagram of a prediction model for leveraging image embeddings and contextual features in predicting user interactions, in an embodiment.

FIG. 7 is a block diagram of a prediction model 700 for leveraging image embeddings and contextual features in predicting user interactions, in an embodiment. Prediction model 700 includes elements of prediction model 600 and prediction model 500. Here, artificial neural network 730 (the "deep" part of prediction model 700) and contextual features 740-748 (the "wide" part of prediction model 700) are trained together to predict likelihood of user interaction (e.g., clicks). Thus, weights of one or more layers of ANN 730 are learned at the same time as weights of contextual features 740-748. The final operations of prediction model 700 are performed by function 750, which may be a sigmoid function $\sigma(W_1*X+W_2*\theta)$ where $\theta=\{e_m, e_c, e_m*e_c\}$, $e_m$ is an aggregate user image embedding (e.g., embedding 722) for user m, $e_c$ is a content item image embedding (e.g., embedding 712) for content item c, $e_m*e_c$ is an element wise product (e.g., embedding 732) of these two embeddings, X is a set of contextual feature values (e.g., contextual feature values 740-748), $W_1$ is a set of machine learned weights for the contextual feature values, and $W_2$ is a set of machine-learned weights for the three embeddings. Output of the sigmoid function is a probability 760 of user interaction.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
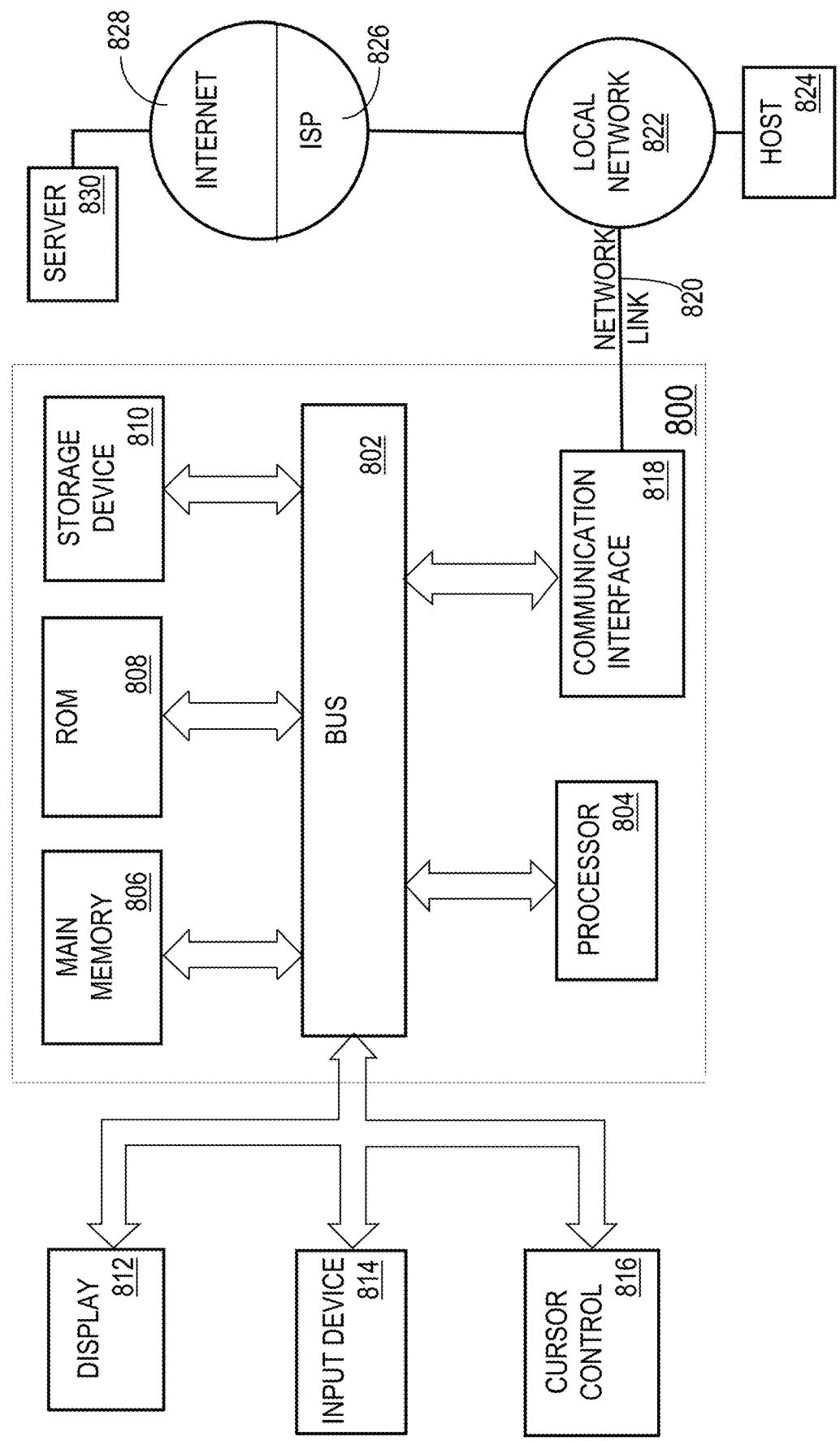
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
inserting a first image into a neural network;
the first image is associated with a first historical user interaction with a first content item;
generating, by the neural network, a first image embedding from the first image;
the neural network is trained to learn image embeddings from images;
identifying a second image;
the second image is associated with a possible future user interaction with a second content item;
inserting the second image into the neural network;
generating, by the neural network, a second image embedding from the second image;
based on the first image embedding and the second image embedding, generating a prediction of whether a particular entity will interact with the second content item;
using one or more machine learning techniques to learn weights for a plurality of contextual features while training one or more layers of the neural network;
based on a content request, identifying a plurality of feature values for the plurality of contextual features;
generating the prediction based on the weights and the plurality of feature values; and
by the neural network, machine learning the weights for the plurality of contextual features separately from at least one of the first image embedding or the second image embedding.

2. The method of claim 1, further comprising:
identifying a third image;
the third image is associated with a second historical user interaction with a third content item with which the particular entity interacted;
inserting the third image into the neural network;
generating, by the neural network, a third image embedding for the particular entity;
performing an aggregation operation that takes, as input, the first image embedding and the third image embedding, and produces an output image embedding; and
generating the prediction based on the output image embedding.

3. The method of claim 1, wherein the plurality of contextual features includes two or more of:
time of the content request, type of device that initiated the content request, or type of channel through which a content item was presented.

4. The method of claim 1, wherein the neural network comprises a convolutional neural network.

5. The method of claim 1, further comprising:
training at least one first layer of the neural network on a plurality of images; and
re-training at least one second layer of the neural network on user interaction data associated with a time interval.

6. The method of claim 1, further comprising:
generating at least one of the first image embedding or the second image embedding by inputting, to the neural network, pixel values of at least one of the first image or the second image, respectively.

7. A method comprising:
inserting a first image into a neural network;
the first image is associated with a first historical user interaction with a first content item;
generating, by the neural network, a first image embedding from the first image;
the neural network is trained to learn image embeddings from images;
identifying a second image;
the second image is associated with a possible future user interaction with a second content item;
inserting the second image into the neural network;
generating, by the neural network, a second image embedding from the second image;
based on the first image embedding and the second image embedding, generating a prediction of whether a particular entity will interact with the second content item;
using one or more machine learning techniques to learn weights for a plurality of contextual features while training one or more layers of the neural network;
based on a content request, identifying a plurality of feature values for the plurality of contextual features;
generating the prediction based on the weights and the plurality of feature values; and
machine learning at least one of the first image embedding or the second image embedding without the plurality of contextual features.

8. A method comprising:
inserting a first image into a neural network;
the first image is associated with a first historical user interaction with a first content item;
generating, by the neural network, a first image embedding from the first image;
the neural network is trained to learn image embeddings from images;
identifying a second image;
the second image is associated with a possible future user interaction with a second content item;
inserting the second image into the neural network;
generating, by the neural network, a second image embedding from the second image;
based on the first image embedding and the second image embedding, generating a prediction of whether a particular entity will interact with the second content item, wherein the neural network comprises a deep portion and a wide portion, and the method further comprises:
training the deep portion to learn image embeddings; and
training the wide portion to learn weights for contextual features.

* * * * *